United States Patent Office 3,377,299
Patented Apr. 9, 1968

3,377,299
LACQUER COMPOSITIONS OF NITROCEL-
LULOSE AND XYLENE-FORMALDEHYDE
POLYMERS
Charles A. Rowe, Jr., Elizabeth, Clifford W. Muessig, Roselle, and Stephen A. Yuhas, Jr., Perth Amboy, N.J., assignors to Esso Research and Engineering Company, a corporation of Delaware
No Drawing. Filed Oct. 15, 1965, Ser. No. 496,706
7 Claims. (Cl. 260—13)

The present invention relates to improved nitrocellulose-based lacquer compositions. More particularly, the present invention is directed to the use of high molecular weight, high oxygen content xylene-formaldehyde resins as a component in nitrocellulose-based lacquer compositions.

Nitrocellulose, resin-modified lacquer compositions have been used in the trade for considerable periods of time. Nitrocellulose-based lacquers containing alkyd resin modifiers give excellent film properties and have been used fairly extensively in the furniture industry. However, use of such lacquers has not been universal due to cost considerations, which to some extent are caused by the relative expensiveness of the alkyd resin modifiers.

Now, in accordance with the present invention, it has been discovered that highly acceptable, relatively inexpensive nitrocellulose-based lacquer compositions can be formed utilizing xylene-formaldehyde resins having the general formula:

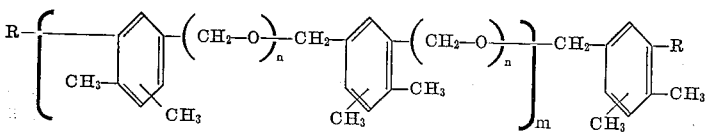

wherein $m$ varies from 1 to 4, $n$ varies from 0 to 2 and R is a hydrogen or a hydroxymethyl radical, and having a number average molecular weight in excess of 750 and an oxygen content of at least 11 percent by weight. The above described xylene-formaldehyde resins are compatable with nitrocellulose in all proportions normally used in lacquer coatings. Additionally, the Gardner color of the xyene-formaldehyde resins are generally less than about 7 in the solvent-free form, so that the resin does not discolor the final lacquer compositions.

Classical lacquer compositions generally consist of a cellulose compound such as nitrocellulose, a resin modifier, and a plasticizer all dissolved in real and latent hydrocarbon sovents. With the use of the xylene-formaldehyde resins of the present invention, it has been surprisingly discovered that flexible surface films can be obtained from lacquer compositions containing these resins without the use of a plasticizer; however, plasticizers may be used. As stated previously, the xylene-formaldehyde resin components of the present lacquer formulations exhibit number average molecular weights as determined by vapor phase osmometry in excss of 750 and oxygen content in excess of 11 wt. percent. Preferably, however, the xylene-formaldehyde resins exhibit number average molecular weights ranging from about 800 to 950 and oxygen contents varying from about 11% to 13%.

The high-molecular weight, high oxygen content xylene-formaldehyde lacquer components of this invention can be formed with techniques well known to the art( see an article by Chiang un Huang, Kobunshi (High Polymers) vol. 10, No. 106 (1961)). In general the desired resin components are formed by reacting either meta-xylene or a mixture of ortho, para, and meta-xylene with formaldehyde in any of its conventional forms such as paraformaldehyde, trioxane, etc. in the presence of an acidic catalyst. The molar ratio of formaldehyde to xylene in the reaction zone varies from 2:1 to 1:2. Conventional acidic catalysts such as aqueous solutions of concentrated sulfuric acid, phosphoric acid and hydrochloric acid as well as the cation types of ion exchange resins can be used to promote the condensation reaction. Aqueous sulfuric acid having a concentration from about 50 to 80 wt. percent is the preferred reaction catalyst.

Preferably, the reaction for the formation of the desired xylene-formaldehyde resin products is carried out at a temperature in the range of from about 60 to 115° C. at about atmospheric pressure for reaction times ranging from about 1 to 48 hours. However, reaction times varying from about 2 to 10 hours at the above conditions of temperature and pressure are suitable to obtain appreciable yields of high molecular weight, high oxygen content xylene-formaldehyde resins. When the reaction is complete, it is desirable to separate the organic product from the aqueous phase and either water wash or neutralize the product. Low boiling materials such as the unreacted aromatic feed and tetramethyldiphenylmethane can then be removed by heating under vacuum (vacuum stripping). The resulting products, after heating under vacuum, boil at about 650° F. at atmospheric pressure and consist of a mixture of complex hydrocarbons, alcohols, ethers as well as certain other minor amounts of high boiling constituents.

The lacquer compositions of the present invention are formed with the hereinbefore described xylene-formaldehyde resins by first mixing nitrocellulose in a hydrocarbon liquid such as in a mixture of toluene and methyl isobutyl ketone with the xylene-formaldehyde resin contained in toluene; adding any plasticizer although plasticizers are not needed when the xylene-formaldehyde resins of the present invention are utilized; and then diluting the above mixture with a number of real and latent liquid hydrocarbon solvents to obtain the final lacquer composition. The total lacquer composition contains about 16 to 25 wt. percent solids (a mixture of nitrocellulose and the present xylene-formaldehyde resin). Of the total solids in the lacquer compositions, roughly from 40 to 60 wt. percent consist of nitro-cellulose and the balance xylene-formaldehyde resin.

For use in lacquers, nitrocellulose is made in several types and classed according to viscosity and type of solvent required for its dissolution. For example, RS (regular soluble), nitrocellulose is the most widely used variety and is soluble in hydrocarbon materials such as esters, ketones, mixtures of ethers and alcohols, etc.

Plasticizers may be used in the lacquer compositions although they are not a necessary ingredient as with lacquer compositions containing alkyd resins. Suitable plasticizers in the present lacquer compositions are principally slowly evaporating solids or liquids such as raw castor oil, blown castor oil, blown linseed and soybean oils, tripheny phosphates, tricresyl phosphates, dibutyl phthalate, dioctyl phthalate, diethyl phthalate, diamyl phthalate, and various esters of sebacic acid.

Selecting the best solvents for nitrocelullose-based lacquers is esentially a problem of balancing physical properties and cost accounting as the better solvents are generally more costly. Solvents used in the laquers fall in three principal classifications: true solvents, latent solvents, and diluents. The most important true solvent useful in the present lacquer compositions is normal butyl acetate. Others are ethyl acetate, amyl acetate, acetone, methyl ethyl ketone, and various types of glycol esters. Diluents comprise toluene, xylene and high solvency naphthas. The above diluents are generally solvents for the xylene-formaldehyde resins but not for the nitrocellulose compound but are tolerated in substantial amounts by solutions of nitrocellulose and other liquids. Ethyl, butyl and other alcohols when used alone have no solvent power for nitrocellulose, but when mixed with true solvents they become effective and are known as latent solvents.

An excellent solvent blend for the nitrocellulose-xylene-formaldehyde resin lacquers of this invention consists of about 15 wt. percent methyl isobutyl ketone, 17 wt. percent butyl acetate, 6% ethyl alcohol, 6% butyl alcohol, 3% hexyl acetate, approximately 31 wt. percent toluene, and the balance a mixture of relatively high boiling saturated aliphatic, napthenic and aromatic hydrocarbons, i.e. Laktane, a mixture of about 60% wt. napthenes, 18% wt. saturated aliphatics, and 22% wt. aromatics.

The present invention is further illustrated by the following examples:

Example 1

To demonstrate the criticality of utilizing xylene-formaldehyde resins having molecular weights in excess of 750 and oxygen contents in excess of 11 wt. percent, a series of nitrocellulose-based xylene-formaldehyde resin lacquers were formulated with various types of xylene-formaldehyde resins. Each of the lacquer compositions contained approximately 20 wt. percent solids consisting of 40 wt. percent nitrocellulose and 60 wt. percent xylene-formaldehyde resin. In each instance, the mixture of nitrocellulose and xylene-formaldehyde resin was dissolved in a solvent blend consisting of 15 wt. percent methyl isobutyl ketone, 17 wt. percent butyl acetate, 6 wt. percent ethyl alcohol, 6 wt. percent butyl alcohol, 3 wt. percent hexyl acetate, 31 wt. percent toluene and 22 wt. percent of a mixture of 18% wt. saturated aliphatic hydrocarbons, 60% naphthenic hydrocarbons and 22% aromatic hydrocarbons boiling at about 200–220° F. Each of the lacquer compositions was then mixed with 10% by wt. of a plasticizer and the total composition sprayed onto walnut or mahogany panels and permitted to dry for 24 hours.

The resulting lacquer films were then tested for hardness and adhesion by rubbing the film surface with sandpaper. Additionally, separate panels were checked for film flexibility using a "cold check" test. The results of the test are set forth in Table I below.

TABLE I

| Run | Xylene-Formaldehyde Resin | | Plasticizer | Film Hardness Sanding [1] | Cold Check-cycles [2] | Remarks |
|---|---|---|---|---|---|---|
| | Mol Wt. | Wt. percent Oxygen | | | | |
| 1 | 450 | 15.1 | Dioctyl Phthalate | | | Surface Film Very Soft. |
| 2 | 802 | 9.1 | ----do---- | | | Resin Incompatible. |
| 3 | 811 | 11.4 | ----do---- | 5-6 | 25+ | Satisfactory Film Hardness. |
| 4 | 811 | 11.4 | Triphenyl Phosphate | 5-6 | 25+ | Do. |

[1] Sanding properties—After the 24-hour drying time, the sprayed panels were sanded with No. 400A Tri-Mite sandpaper. The number of cycles required to cause the coating to clog and roll up beneath the sandpaper were recorded. One cycle consisted of moving a piece of sandpaper under the pressure of the index and middle fingers across the test area and returning to the starting point.

[2] Cold-check-Cycles—The cold-check-cycle consisted of 1-hour exposure of the test panel at 110° to 120° F. followed by a change to a temperature of −6° F. with exposure at that temperature for 1 hour. All panels were allowed to stabilize at room temperature for a period of 1½ hours, after which they were inspected for cracks and checks. Values reported as 25+ indicate that the coatings withstood 25 cycles without failure, but were not tested further.

The test recorded in Table I above demonstrates the necessity of utilizing xylene-formaldehyde resins having molecular weights in excess of 750 and oxygen contents in excess of 11 wt. percent. In run 1, the lacquer obtained with the resin having a molecular weight of 450 and an oxygen content within the desired range resulted in very soft surface films. In the case of run 2, the resin used had a molecular weight within the desired range but the oxygen content of the resin was beneath the desired level. In this run, the xylene-formaldehyde resin was incompatible with the nitrocellulose. Runs 3 and 4 demonstrate that with the use of resins having the desired molecular weight and oxygen content, hard lacquer films are obtained.

Example 2

To show the flexibility of lacquers containing the xylene-formaldehyde resins of the present invention, a series of nitrocellulose-based lacquers were prepared containing varying amounts of alkyd resins, xylene-formaldehyde resins, and mixtures of xylene-formaldehyde resins and alkyl resins. In every instance the lacquers contained about 20 wt. percent solids and the solvent blend of Example 1 was used in conjunction with the nitrocellulose and resin component. In each test three coats of lacquer were sprayed onto sanded birch panels within an 8 hour period. Each of these panels were air-dried at room temperature for 3 hours between coats and dried overnight after the last coat. The finished panels were then force-dried at 130° F. for 8 hours. After the force drying, the panels were conditioned for at least 48 hours at 77° F. before exposure to cold-check cycles. As with Example 1, the cold-check cycles consisted of a 1-hour exposure at 110 to 120° F. followed by a change to a temperature −6° F. with exposure at that temperature for 1 hour. All the panels were allowed to stabilize at room temperature for a period of 1.5 hours after which they were inspected for cracks and checks. Values reported as 25+ indicate that the coatings withstood the 25 cycles without failure, but they were not tested further. The results of the cold-check test cycles are recorded in Table II.

TABLE II

| Run No. | 1 | 2 | 3 | 4 | 5 | 6 | 8 | 9 | 10 | 11 | 12 | 15 | 16 | 18 |
|---|---|---|---|---|---|---|---|---|---|---|---|---|---|---|
| RS Nitrocellulose, ½ sec. Solid wt. percent | 40 | 40 | 15 | 15 | 45 | 45 | 45 | 45 | 47.5 | 50 | 19 | 22.5 | 15 | 45 |
| RS Nitrocellulose, ¼ sec. Solid wt. percent | | | 25 | 25 | | | | | | | 31 | 37.5 | 25 | |
| Xylene-Formaldehyde Resin wt. percent | | | | | | | 55 | 45 | 52.5 | 50 | 50 | 30 | 30 | 27.5 |
| Cellolyn 502 Alkyd [1] | 50 | | 50 | | 45 | | | | | | | | 30 | 27.5 |
| Beckosol P-222 Alkyd [2] | | 50 | | 50 | | 45 | | | | | | | | |
| Castor Oil/Dibutyl Phthalate (1:1) | 10 | 10 | | | 10 | 10 | | 10 | | | | | | |
| Dioctyl Phthalate | | | 10 | 10 | | | | | | | | 10 | | |
| No. of Cycles Passed | 6 | 6 | 3-4 | 5-6 | 10-15 | 7 | 25+ | 25+ | 25+ | 25+ | 19 | 14 | 14 | 25+ |

[1] A high grade, non-drying coconut oil alkyd resin.
[2] A medium grade, non-drying coconut oil alkyd resin.

Cold-check test for determining the resistance of lacquer films to rapid changes in temperature are extremely important in evaluating lacquer compositions. The tests are designed to measure the flexibility of the lacquer coating. Xylene-formaldehyde resin lacquers containing as high as 50 wt. percent nitrocellulose (based on total solids) passed 25 severe temperature cycles with no sign of failure as is demonstrated in Table II above. The cold-check resistance of lacquers containing blends of xylene-formaldehyde resins and alkyl resins, without plasticizer, was significantly greater than lacquers modified with alkyd resins and plasticizer. The cold-check test for performances of lacquer employing the xylene-formaldehyde resins of this invention, as either partial or complete replacements for the alkyl and plasticizer components are superior to those of high-quality, plasticized, alkyd-modified lacquers.

Further advantages of this invention will be apparent to those skilled in the art. It is to be understood that this invention is not limited to the specific examples set forth herein that have been offered merely as illustrations and that modifications may be made without departing from the spirit and scope of the appended claims.

What is claimed is:

1. A lacquer composition comprising nitrocellulose and a xylene-formaldehyde resin as solid constituents dissolved in a hydrocarbon liquid, said xylene-formaldehyde resin having a number average molecular weight in excess of 750 and an oxygen content of at least about 11 wt. percent.

2. The composition of claim 1 wherein said nitrocellulose and xylene-formaldehyde resin solid constitutents constitute from 16 to 25 wt. percent of said total composition.

3. The composition of claim 2 wherein said solid constituents consist of from 40 to 60 wt. percent nitrocellulose and from 60 to 40 wt. percent xylene-formaldehyde resin.

4. A lacquer composition comprising nitrocellulose and a xylene-formaldehyde resin as solid constituents dissolved in a hydrocarbon liquid, said xylene-formaldehyde resin having a number average molecular weight as determined by vapor pressure osmometry of from about 800 to 950 and an oxygen content in the range of from about 11 to 13 wt. percent.

5. The composition of claim 4 wherein said nitrocellulose and xylene-formaldehyde resin solid constituents constitute from 16 to 25 wt. percent of said total composition.

6. The composition of claim 5 wherein said solid constituents consist of from 40 to 60 wt. percent nitrocellulose and from 60 to 40 wt. percent xylene-formaldehyde resin.

7. An unplasticized lacquer composition consisting essentially of nitrocellulose and a xylene-formaldehyde resin as solid constituents dissolved in a hydrocarbon liquid, said solid constituents constituting from 16 to 25 wt. percent of said total composition, said xylene-formaldehyde resin having a number average molecular weight as determined by vapor pressure osmometry of from about 800 to 950 and an oxygen content in the range of from about 11 to 13 wt. percent.

References Cited

UNITED STATES PATENTS 3,303,167   2/1967   Kakinchi et al. _____ 260—67

WILLIAM H. SHORT, *Primary Examiner.*

J. NORRIS, *Assistant Examiner.*